United States Patent Office 3,366,584
Patented Jan. 30, 1968

3,366,584
AQUEOUS DISPERSIONS CONTAINING POLYMERIC THICKENING AGENTS
Carl A. Zimmerman, Dover, Del., assignor to International Latex & Chemical Corporation, Dover, Del., a corporation of Delaware
No Drawing. Filed Nov. 13, 1964, Ser. No. 411,117
11 Claims. (Cl. 260—4)

This invention relates to hydrolyzed polymers of esters of alpha-methylene monocarboxylic acids and to the thickening agents produced from these hydrolyzed polymers. This invention also relates to the thickening of aqueous dispersions, particularly water-insoluble polymeric materials of either natural or artificial origin by the addition of these hydrolyzed polymers and to the thickened dispersions thereby obtained.

Heretofore, various thickening agents have been used to adjust aqueous dispersions, including latices of natural or synthetic polymers to a suitable viscosity for the numerous applications to which such dispersions may be used. For example, salts of polyacrylic acid and polymethacrylic acid have been used as thickeners in various aqueous systems. Products suitable for this utility have also been made by the hydrolysis of esters, amides, or nitriles of acrylic acid. These known thickening agents, however, necessarily were added in relatively large quantities in order to impart the thickening characteristics for which they were used. While the various thickening agents heretofore employed were found to be adequate in adjusting some aqueous dispersions, i.e., synthetic polymer latices to a suitable viscosity for proper application, a disadvantage stemming from their use was the relatively large amount of thickening agent necessitated for the desired results. The addition of large amounts of thickening agents manifestly changes the proportion of ingredients in the aqueous dispersions to which they are added and, consequently, may impair the properties of the products ultimately obtained from such dispersions. Advantageously, the use of relatively small amounts of the thickening agents of this invention will substantially increase the viscosities of aqueous dispersions, particularly latices of natural or synthetic polymers.

This invention contemplates hydrolyzed polymers of esters of alpha-methylene monocarboxylic acids which provide thickening agents having greatly improved thickening efficiencies for aqueous dispersions. In particular, this invention is directed to thickening agents produced from emulsion polymerized alkyl esters of certain alpha-methylene monocarboxylic acids that have been hydrolyzed with certain alkali metal hydroxides and to methods for producing these thickening agents.

In addition, this invention contemplates aqueous dispersions including latices of natural or synthetic polymers having increased viscosities which contain relatively small amounts of said thickening agents and to methods for producing these thickened dispersions.

As used herein the term "thickening efficiency" refers to the comparison of an increase in viscosity or thickening effect produced by the addition of a minimum amount of a thickening agent of this invention to an aqueous dispersion of a polymeric material or other insoluble materials with that produced by a same amount of another thickening agent.

In accordance with this invention, improved thickening agents are produced by polymerizing a monomeric alkyl ester of an alpha-methylene monocarboxylic acid under emulsion polymerizing conditions in the presence of certain emulsifiers, i.e., an alkyl or aralkyl polyoxyethylene phosphate, and subsequently subjecting the resulting polymeric product to hydrolysis in the presence of an alkali metal caustic, e.g., lithium hydroxide, sodium hydroxide or potassium hydroxide per se or mixtures thereof. Mixtures of lithium hydroxide with at least one other hydroxide, e.g., sodium hydroxide are particularly effective.

The monomeric esters suitable for purposes of this invention are esters of alpha-methylene monocarboxylic acids and may be represented by the general formula:

(I) 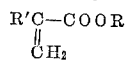

wherein R' is hydrogen or an alkyl radical containing 1 to 3 carbon atoms and R is an alkyl radical containing from 1 to 3 carbon atoms; preferably R' is hydrogen and R is a methyl radical.

The esters represented by the above formula are methyl acrylate, ethyl acrylate, propyl acrylate, methyl methacrylate, ethyl methacrylate and propyl methacrylate. The alkyl esters of acrylic acid are of particular interest, with methyl acrylate being preferred.

The alkyl and aralkyl polyoxyethylene phosphates employed in accordance with the present invention are characterized by the following general formulae:

(II) 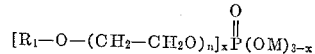

and (III) 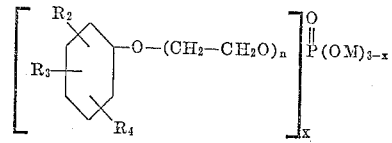

wherein $R_1$ represents an alkyl radical containing from 8 to 27 carbon atoms, e.g., octyl, nonyl, decyl, dodecyl, tetradecyl, pentadecyl, hexadecyl, octadecyl, eicosyl, heneicosyl, docosyl, tricosyl, tetracosyl, pentacosyl, heptacosyl and the like, with the octyl and nonyl radicals being the preferred; $R_2$ represents alkyl or cycloalkyl radicals containing 5 to 27 carbon atoms, e.g., pentyl, hexyl, heptyl, octyl, and the like, cyclopentyl, cyclohexyl, cycloheptyl, cyclooctyl, methylcyclopentyl, methylcyclohexyl, methylcyclooctyl, methcyclobutyl, 1,1-dimethylcyclopropyl, ethylcyclopropyl, ethylcyclobutyl, 1 - ethyl - 2 - methylcyclopropyl, 1,1,2 - trimethylcyclopropyl, 1,2,3 - trimethylcyclopropyl, 1,2 - dimethylcyclopentyl, 1,3 - dimethylcyclohexyl, 1,4 - dimethylcyclohexyl, and the like, ethylcyclohexyl, ethylmethylcyclopentyl, 1,1,2 - trimethylcyclopentyl, cyclononyl, propylcyclohexyl, 1,2,4 - trimethylcyclohexyl, 1,3,5-trimethylcyclohexyl, 1-isopropyl-4-methylcyclohexyl, 1,2,4,5-tetramethylcyclohexyl; $R_3$ and $R_4$ each represent either hydrogen, an alkyl radical containing from 1 to 22 carbon atoms, e.g., methyl, ethyl, propyl, butyl, and the like or the cycloalkyls defined by $R_2$; $n$ represents the degree of oxyethylenation of the molecule which ranges from 1 to 60 moles of ethylene oxide per mole of phenolic or straight or branched chain alcohol compounds from which the phosphates of Formulae II and III are derived, $x$ is an integer from 1 to 2 and M represents hydrogen, an ammonium radical, and alkali metal cation, such as sodium, potassium, lithium, and the like or mixtures thereof. Preferably M is a mixture of hydrogen and an alkali metal, e.g. sodium.

It will be understood that in some instances an alkyl substituted mono-, di-, and trimethyl ammonium radical; mono-, di-, and tri- (hydroxyethyl) ammonium radicals; mono-, di- and triisopropyl ammonium radicals; alkylamine, e.g., propylamine; cyclohexylamine, abietyl amine, alkanol amine, e.g., propanol amine, ethanolamine; cyclohexanolamine and other amino-salt forming radicals may be represented by M.

It will be appreciated that the acid phosphates defined by the above general formulae, that is, those wherein M is hydrogen, may be produced by several conventional methods known to the art.

In accordance with this invention, the preferred salt forms (i.e. partial salts) defined by the above formulae are produced by effecting neutralization of the acid phosphates to a pH of from about 5 to about 7 with the appropriate alkaline material.

The amount of emulsifier, i.e., polyoxyethylenated alcohol phosphate or polyoxyethylenated alkyl phenol phosphate is usually between about 1 and 10 parts by weight, preferably between about 3 to 5 parts by weight per 100 parts by weight of acrylate monomer or mixture of monomers. The polymerization may be effected in either a neutral, slightly alkaline or acid medium, and may range in pH from about 1.5 to about 8.5, and preferably from about 4.0 to about 6.5. The pH may be varied by adjusting the emulsion to the desired value by the addition of sodium or potassium hydroxide, sodium acetate, hydrochloric acid or the like.

The acrylate monomers to be polymerized may be added intermittently, continuously or all at one time, depending on the reaction conditions and the nature of the polymerization equipment. For example, a reflux-type condensing reactor is particularly effective for polymerization in which all of the monomer is charged initially.

The polymerization is catalyzed as usual with a compound or a mixture of compounds yielding free radicals with or without a mercaptan modifier. The catalyst may be any one of the inorganic persulfates, organic peroxides, and the like, which are normally employed in polymerization reactions and may range from 0.05 to 1.0 part by weight per 100 parts of the monomer or mixtures of monomers. The temperature may range from about 50° to about 100° C. Pressure will depend upon the vapor pressure of the monomers used and the temperature required to produce acceptable rates of polymerization with the chosen catalyst. Pressure may vary from atmospheric to one hundred pounds per square inch gauge.

In hydrolyzing the polymers of this invention, which are subsequently employed as thickening agents, the aqueous emulsion resulting from the polymerization step is first treated with an aqueous solution of an alkaline hydrolyzing agent to effect a hydrolysis of the carboxyl groups of the polymer to form

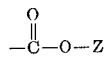

groups, where Z is the cation of the hydrolyzing agent. This hydrolysis is carried out under conditions such that substantially no coagulated polymer is formed in the mixture since hydrolysis proceeds most rapidly and uniformly in a smooth emulsion which is substantially free of coagulated polymer. This is preferably accomplished by using relatively dilute aqueous solutions of the alkaline hydrolyzing agent, for example, solutions containing less than 20% of the hydrolyzing agents. The amount of hydrolyzing agent used in this stage of the hydrolysis is preferably such as to hydrolyze about 60 to 100% of the carboxyl groups of the polymer. Another factor of some importance in the hydrolysis step is that the concentration of polymer in the hydrolyzing mixture is maintained sufficiently low to avoid the coagulation of the polymer. In general, coagulation of the polymer is avoided under the above conditions when the hydrolysis mixture contains less than 15% by weight of the polymer.

Before the hydrolysis is initiated, it may be necessary to add a stabilizing agent along with the hydrolyzing agent in order to maintain the viscosity of the resulting solution. The stabilizing agent is preferably incorporated in the aqueous solution of the hydrolyzing agent and is added in amounts sufficient to reduce the viscosity of the final solution to a workable level, e.g., in concentrations of about 2 to 10 parts by weight based on the weight of the polymer. Exemplary of the stabilizing agents suitable for this stage of the preparation of the thickening agent are polyoxyethylated alcohols and the like.

In accordance with this invention, the hydrolysis may be conducted from ambient temperatures to temperatures of about 80° to 100° C. The hydrolysis proceeds very slowly at ambient temperatures and it is generally necessary to use the elevated temperatures to obtain a practical rate of hydrolysis of the carboxyl groups in the polymer. For example, it has been found that when employing ambient temperatures, a thickening efficiency of about 75% is obtained in the hydrolyzed product after about 24 hours; with about a 90% efficiency being obtained after about 48 hours. It has also been found that to obtain maximum thickening efficiency a hydrolysis period of about 7 days at ambient temperatures, i.e., 20–23° C., is required. Advantageously, it has been determined that use of temperatures ranging from 90° to 100° C., preferably 95° C., at atmospheric pressure results in a much faster hydrolysis reaction and that maximum efficiency can be obtained in periods of from 1 to 3 hours.

It is also possible to carry out the hydrolysis of the polymer by the stepwise addition of an aqueous solution of the alkaline hydrolyzing agent. The solution of the hydrolyzing agent may be added to the polymer dispersion continuously as long as dilute aqueous solutions of the agent are used in the initial stages of hydrolysis, that is, until about 4 to 10% of the carboxyl groups of the polymer are hydrolyzed, and as long as the polymer concentration is maintained sufficiently low to avoid the formation of gelled or coagulated polymer.

In accordance with the present invention, in order to prepare thickening agents having enhanced thickening efficiencies, the hydrolyzing agent employed is an alkali metal hydroxide such as lithium hydroxide, sodium hydroxide or potassium hydroxide, or mixtures thereof. Mixtures of lithium hydroxide with at least one other alkali metal hydroxide, e.g., sodium hydroxide are particularly effective. Thus, blends of lithium hydroxide with sodium and/or potassium hydroxide, and the like, e.g., in ratios of 1:1, are suitably employed. The hydrolyzing agent is preferably employed in the form of an aqueous solution.

The mole ratio of hydroxide employed in the hydrolysis step is found to be critical. Thus, in accordance with this invention improved thickening efficiency is accomplished by employing a mole ratio of hydroxide of from 0.50 up to about 1.2 relative to the polymer solids, with optimum thickening efficiencies being obtained with a mole ratio of about 0.65 to 0.85 relative to the polymer solids. It is understood that particularly advantageous results are accomplished if the mole ratios employed are made dependent on the pH of the emulsifier used to prepare the polymer. Thus, for example, it has been found that if the pH of the emulsifier is adjusted to a pH in the range of 5–6, that a mole ratio of from 0.75 to 1.2 and preferably 0.85 is advantageously employed. If, however, the emulsifier has a pH in the range of about 3, then a mole ratio of from 0.50 to 0.90 and preferably 0.75 is advantageously employed.

As a result of the hydrolysis procedure hereinbefore described, a thickener comprising a salt of a polyalkylate in which at least 60 percent of the carboxyl groups have been converted to (COOZ) groups, wherein Z is the cation of the alkali hydrolyzing agent, is obtained.

The latices, that is the aqueous dispersions of the water-insoluble polymers which can be treated with the thickeners of this invention may contain emulsifiers of any type including anionic or non-ionic emulsifiers. Suitable anionic emulsifiers that may be present include the higher fatty alcohol sulfates such as the sodium or potassium salts of the sulfates of alcohols having from 8 to 18 carbon atoms such as lauryl alcohol, alkali metal salts or amine salts of higher fatty acids, such as those of fatty acids having from 8 to 18 carbon atoms with sodium, potassium, or any of the ethanolamines, such as triethanol-amine, examples of which include triethanolamine oleate or stearate, sulfonated compounds such as turkey red oil or sulfonated ricinoleic acid, and sulfonated alkylaryl compounds, such as sodium tert-octyl benzene sulfonate and sodium tert-octylphenol sulfonate. Examples of nonionic emulsifiers include alkylphenoxypolyethoxyethanols having alkyl groups of about seven to eighteen carbon atoms and about 9 to 30, or more, oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing the required proportion of ethylene oxide with nonyl, dodecyl, tetradecyl, and the like mercaptans or with alkyl thiophenols having alkyl groups of 6 to 15 carbon atoms; ethylene oxide derivatives of long-chained carboxylic acids, such as lauric, myristic, palmitic, oleic, and the like or mixtures of acids such as found in tall oil; ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, etc.

The polymer salts of the present invention are useful for thickened dispersions of water-insoluble polymers of all types. Besides natural rubber latex, artificial latices or aqueous dispersions of emulsion polymers of monoethylenically unsaturated vinyl or acrylic monomer types as well as other elastomeric types of polymers may be so thickened. Examples of aqueous dispersions that may be thickened include those of copolymers of styrene with butadiene (e.g., 30 mole percent styrene to 70 mole percent of butadiene); copolymers of butadiene with the alpha methylene carboxylic acids, and their esters, nitriles and amides, such as acrylic acid, methyl acrylate, methyl methacrylate, acrylonitrile, methacrylonitrile, methacrylamide, and the like; copolymers of butadiene or other dienes with unsaturated polycarboxylic acids, their ester (partial and full) nitriles, and the like such as itaconic acid, methyl monomaleate and the like, homopolymers of styrene, copolymers of 75% to 95% vinyl chloride with 5% to 25% of vinylidene chloride, acrylonitrile or vinyl acetate, polychloroprene, vinyl acetate homopolymers and copolymers, copolymers of styrene with maleic anhydride, homopolymers and copolymers of acrylic acid esters or methacrylic acid esters, such as those of alcohols having 1 to 8 carbon atoms listed hereinabove, also copolymers of the acrylic acid esters or methacrylic acid esters with vinyl chloride, vinyl acetate, acrylonitrile, styrene or the like.

In carrying out the method of thickening aqueous dispersions in accordance with this invention, any desired amount of thickening agent may be employed which will accomplish the desired thickening effect. Thus, the upper limit of the thickening agent utilized is determined by the efficiency of the particular thickener utilized. As mentioned, however, the advantages accruing to the products of this invention are found in their high thickening efficiency and, consequently, the relatively small amounts thereof which may be employed. It is found, therefore, that from about 0.2 to about 3.0 percent by weight of thickening agent, based on the weight of aqueous dispersion to be thickened, will advantageously thicken the aqueous dispersion to a desired viscosity.

The thickeners obtained in accordance with the present invention have additional utility in addition to thickening polymer latices. Representative of some uses are thickening of pigment pastes used for printing on paper and for the printing and pigment-dyeing of textiles; thickening of other aqueous compositions to be applied to textiles such as adhesives, warp sizes, permanent sizes, backings, especially for rugs and other pile fabrics; clarification of raw water, especially saline waters to be used in the recovery of oil from exhausted oil wells by the water-flooding technique; preparation of drilling muds; and thickening of cosmetic creams and pastes, and the like.

The following examples are illustrative of the invention, and the parts and percentages therein are by weight unless otherwise indicated.

EXAMPLE I

An aqueous dispersion of a butadiene/styrene/methacrylic acid copolymer was prepared by polymerization at a temperature of 55° C. in a glass lined pressure type reactor in accordance with the following recipe:

| Ingredient— | Parts by weight |
|---|---|
| Butadiene | 70 |
| Styrene | 27 |
| Methacrylic acid | 3 |
| Distilled water | 150 |
| Sodium salt of dodecylbenzene sulfonate | 4 |
| Daxad 11 [1] | 0.5 |
| Ethylenediaminetetraacetic acid | 0.04 |
| Tert-dodecylmercaptan | 0.4 |
| $Na_2SO_4$ | 0.2 |
| Potassium persulfate | 0.1 |

[1] Sodium salt of polymerized alkyl naphthalene sulfonic acid. Product of Dewey and Almy.

The resulting latex was stripped to remove unreacted monomers and then stabilized by the addition of 0.5 part by weight of a nonionic surfactant, i.e., Igepal CO 880, and its pH adjusted to about 8.5–9.0 with ammonium hydroxide.

EXAMPLE II

The latex prepared in Example I was employed in a series of runs illustrating the utility of the thickeners of this invention.

A series of polymers was produced from methyl acrylate. Several samples of the monomer were emulsion polymerized in an aqueous system containing various emulsifiers, as herein later defined, within a reaction vessel at a temperature of about 80° C. until at least about 95% conversion was obtained. The resulting polymers were hydrolyzed using various hydrolyzing agents to polymer ratios. The hydrolyzing agents utilized were a 1:1 mixture of lithium and sodium hydroxide (Li-Na) and sodium hydroxide per se (Na) at a temperature of from 90° to 100° C. for about 1 to 2 hours. Then, the hydrolyzed products were used to thicken samples of the latex produced in Example I.

In the following data, the figures are Brookfield viscosities measured in centipoise using a No. 4 spindle at 10 r.p.m. at a temperature of 25° C. In each group of figures (i.e., those shown for each emulsifier at a given hydroxide level) the first figure represents the viscosity obtained immediately after the addition of the thickener to the latex. The second and third figures show the values obtained 24 hours later; the second figure in the value obtained before stirring and the third, the value obtained after stirring. The amount of thickener employed was in all instances, 1.0 part per 100 parts of latex solids.

The emulsifiers employed are identified as follows:

Sodium salt of dodecyl benzene sulfonate.
GAFAC RE960 [2]—nonyl phenoxypoly(ethyleneoxy) phosphate containing about 90% by weight of combined ethylene oxide.
GAFAC RM710 [2]—dinonyl phenoxy poly(ethyleneoxy) phosphate containing about 70% by weight of combined ethylene oxide.

Each of the phosphate emulsifiers were converted to partial salts by being neutralized to a pH of about 6 with sodium hydroxide.

[2] Produced by Antara Chemicals, a division of General Aniline and Film Corporation.

In the case of the sodium salt of dodecyl benzene sulfonate hydrolysis with NaOH was not accomplished because of an immediate agglomeration of the latex upon the addition of the NaOH.

were prepared to show the effects that are produced by varying the alkali metal hydroxide used during the hydrolysis of the polymer. Samples of methyl acrylate were polymerized in the presence of the phosphate emulsifier TABLE 1.—COMPARISON OF PHOSPHATE EMULSIFIERS WITH A SULFONATE EMULSIFIER IN THE PRODUCTION OF THICKENERS FOR POLYMER LATICES

| | Alkali Ratio | | | | | | | | | |
|---|---|---|---|---|---|---|---|---|---|---|
| | 0.6 | | 0.7 | | 0.8 | | 0.9 | | 1.0 | |
| | Hydrolyzing Agent | | | | | | | | | |
| | Li–Na | Na | Li–Na | Na | Li–Na | Na | Li–Na | Na | Li–Na | Na |
| 1. GAFAC RE410 | 10,000<br>10,680<br>10,640<br>18,000<br>19,720<br>17,800 | 9,200<br>10,800<br>11,600<br>12,800<br>14,000<br>14,000 | 18,820<br>19,440<br>18,000<br>25,440<br>28,800<br>27,040 | 14,800<br>16,200<br>16,400<br>20,800<br>23,600<br>24,400 | 21,640<br>22,800<br>21,800<br>21,800<br>25,040<br>27,760 | 20,600<br>24,000<br>22,400<br>23,000<br>26,000<br>28,400 | 21,120<br>21,440<br>20,850<br>20,560<br>24,800<br>23,800 | 21,200<br>23,200<br>23,200<br>23,800<br>28,000<br>29,100 | 19,040<br>20,240<br>20,040<br>20,480<br>23,560<br>21,700 | 21,600<br>23,200<br>23,200<br>20,600<br>24,000<br>26,000 |
| 2. GAFAC RM710 | | | | | | | | | | |
| 3. Sodium salt of dodecyl benzene sulfonate | 9,600<br>10,600<br>10,400 | | 18,820<br>19,600<br>16,900 | | 11,020<br>11,600<br>12,800 | | 11,760<br>12,000<br>12,100 | | 12,000<br>12,000<br>11,900 | |

Inspection of the above data shows that small amounts of the thickening agents of this invention (that is, those produced in the presence of the phosphate emulsifiers) produce substantially greater viscosities in the treated latex than produced by the sulfonate emulsified polymers. In each run, the thickening efficiency of the phosphate emulsified thickening agents was equal to or substantially greater than that produced in the presence of the sulfonate emulsifier. In general, the resulting viscosities vary from a few thousand to several thousand centipoises more when using the thickening agents of this invention.

EXAMPLE III

Using the identical procedure and reaction conditions described for Example II two additional polymers of methyl acrylate were prepared to show the comparative thickening efficiencies of the thickening agents of this invention with polymers prepared in the presence of a sulfate emulsifier. In this example, the phosphate emulsifier was GAFAC RE410 a nonylphenoxypoly(ethyleneoxy) phosphate containing about 40% by weight of combined ethylene oxide (produced by Antara Chemicals), which had also been partially neutralized with sodium hydroxide to a pH of about 6 and the sulfate emulsifier was SIPEX EST, a sodium salt of tridecyl ether sulfate (produced by Alcolac Chemical Corporation).

As shown by the following data use of the higher levels of hydroxide and phosphate emulsifiers produces thickening agents having greater thickening efficiency than those produced using sulfate emulsifiers.

TABLE 2.—COMPARISON OF A PHOSPHATE EMULSIFIER WITH A SULFATE EMULSIFIER IN THE PRODUCTION OF THICKENERS FOR POLYMER LATICES

| | Alkali Ratio | | | | | |
|---|---|---|---|---|---|---|
| | 0.8 | | 0.9 | | 1.0 | |
| | Hydrolyzing Agent | | | | | |
| | Li–Na | Na | Li–Na | Na | Li–Na | Na |
| 1. GAFAC RE410 | 17,860<br>18,800<br>18,120 | 17,000<br>17,000<br>17,500 | 16,040<br>17,040<br>16,520 | 18,400<br>18,600<br>18,500 | 15,600<br>16,480<br>16,320 | 18,850<br>18,200<br>18,400 |
| 2. SIPEX EST | 15,750<br>16,000<br>15,800 | 14,000<br>15,600<br>16,400 | 15,120<br>15,400<br>15,500 | 14,450<br>16,000<br>16,000 | 14,220<br>14,800<br>14,600 | 13,400<br>14,800<br>14,800 |

EXAMPLE IV

Using the same general polymerization conditions described in Example II, additional polyacrylate thickeners were prepared from GAFAC RM710 described in Example II, hydrolyzed with 0.85 mole of an alkali metal hydroxide per mole of polymer and then employed as a thickener for a commercially available latex sold by International Latex Corporation and designated as "TYLAC 3010." This latex is further identified by the brochure "TYLAC Latex 3010" made available in December 1960 by the International Latex Corporation.

In this series of runs, 0.67 part of the thickening agent per hundred parts of latex solids were used. As shown by the following data the thickening agent with lithium hydroxide exhibits particularly high levels of thickening efficiency.

TABLE 3.—VARIATION OF THICKENING EFFICIENCY CAUSED BY HYDROLYSIS WITH DIFFERENT HYDROXIDES

| | Viscosity of Latex [1] | | |
|---|---|---|---|
| Hydroxides, .85 mole/mole of polymer | Initial | After 24 hours | |
| | | No stirring | Stirring |
| LiOH | 9,700 | 12,000 | 9,200 |
| Na:Li | 6,200 | 7,400 | 6,000 |
| NaOH | 6,300 | 7,600 | 6,000 |
| KOH | 3,100 | 4,200 | 3,000 |

[1] TYLAC 3010.

It will be appreciated that the latices used in the above examples are merely representative of the aqueous dispersions of insoluble polymers and the like which can be thickened in accordance with this invention.

Furthermore, it is to be understood that various other modifications can be made without departing from the spirit of the invention and that the scope of the invention is determined not by the above specific embodiments, but rather construed by the appended claims.

What is claimed is:

1. A thickened aqueous dispersion which comprises from about 0.2 to about 3.0 percent by weight of a thickening agent, and an aqueous dispersion of a water-insoluble material capable of being thickened by said thickening agent, the weight of said thickening agent being based on weight of the aqueous dispersion to be thickened, said thickening agent being obtained by polymerization of a monomeric ester of an alpha-methylene monocarboxylic acid in an aqueous emulsion containing an emulsifying agent selected from the group consisting of the following formulae:

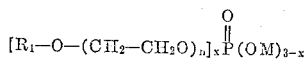
and
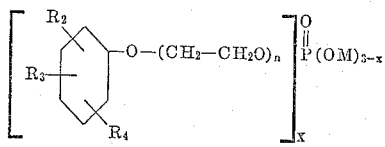

wherein $R_1$ represents an alkyl radical containing from 8 to 27 carbon atoms, $R_2$ represents a member selected from the group consisting of alkyl and cycloalkyl radicals containing from 5 to 27 carbon atoms, $R_3$ and $R_4$ represent a member selected from the group consisting of hydrogen, an alkyl radical containing from 8 to 27 carbon atoms and a cycloalkyl radical containing from 5 to 10 carbon atoms, $x$ is an integer from 1 to 2, M represents a cation selected from the group consisting of hydrogen, alkali metals, ammonium and mixtures thereof; and $n$ represents the degree of oxyethylenation ranging from 1 to 60 and by subsequently hydrolyzing the resulting emulsified polymer in an aqueous system with a hydrolyzing agent selected from the group consisting of an alkali metal hydroxide and mixtures thereof, said hydrolyzing agent being employed in a mole ratio of from about 0.50 to 1.2 based on the polymeric solids in said aqueous system.

2. The thickened aqueous dispersion of claim 1 in which said aqueous dispersion includes natural rubber latex and synthetic latices of polymers produced from monomers selected from the group consisting of ethylenically unsaturated compounds, dienes, and mixtures thereof.

3. The thickened aqueous dispersion of claim 1 in which the ester of an alpha-methylene monocarboxylic acid has the formula:

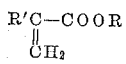

wherein R' is a member selected from the group consisting of hydrogen and an alkyl radical containing from 1 to 3 carbon atoms and R is an alkyl radical containing from 1 to 3 carbon atoms.

4. The thickened aqueous dispersion of claim 1 in which the ester of an alpha-methylene monocarboxylic acid is methyl acrylate.

5. The thickened aqueous dispersion of claim 1 in which the emulsifier is a nonyl phenoxypoly (ethyleneoxy) phosphate containing from about 40 to about 90 percent by weight of combined ethylene oxide.

6. The thickened aqueous dispersion of claim 1 in which the emulsifier is a dinonyl phenoxypoly (ethyleneoxy) phosphate containing from about 40 to about 90 percent by weight of combined ethylene oxide.

7. A method of thickening an aqueous dispersion without substantially changing the proportions of its contents which comprises adding from 0.2 to about 3.0 percent by weight of a thickening agent to said dispersion, said thickening agent being obtained by polymerization of a monomeric ester of an alpha-methylene monocarboxylic acid in an aqueous emulsion containing an emulsifying agent selected from the group consisting of the following formulae:

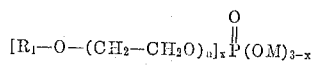
and
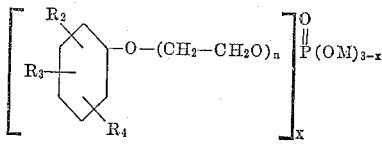

wherein $R_1$ represents an alkyl radical containing from 8 to 27 carbon atoms, $R_2$ represents a member selected from the group consisting of alkyl and cycloalkyl radicals containing from 5 to 27 carbon atoms, $R_3$ and $R_4$ represent a member selected from the group consisting of hydrogen, an alkyl radical containing from 8 to 27 carbon atoms and a cycloalkyl radical containing from 5 to 10 carbon atoms, $x$ is an integer from 1 to 2, M represents a cation selected from the group consisting of hydrogen, alkali metals, ammonium and mixtures thereof; and $n$ represents the degree of oxyethylenation ranging from 1 to 60 and by subsequently hydrolyzing the resulting emulsified polymer in an aqueous system with an alkaline hydrolyzing agent, said hydrolyzing agent being employed in a mole ratio of from about 0.5 to 1.2 based on the polymeric solids in said aqueous system.

8. The method of claim 7 in which the ester of an alpha-methylene monocarboxylic acid has the formula:

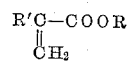

wherein R' is a member selected from the group consisting of hydrogen and an alkyl radical containing from 1 to 3 carbon atoms and R is an alkyl radical containing from 1 to 3 carbon atoms.

9. The method of claim 7 in which the ester is methyl acrylate.

10. The method of claim 7 in which the emulsifier is a nonyl phenoxypoly (ethyleneoxy) phosphate containing from about 40 to about 90 percent by weight of combined ethylene oxide.

11. The method of claim 7 in which the emulsifier is a dinonyl phenoxypoly (ethyleneoxy) phosphate containing from about 40 to about 90 percent by weight of combined ethylene oxide.

References Cited
UNITED STATES PATENTS

| | | | |
|---|---|---|---|
| 3,029,228 | 4/1962 | Clavis | 260—89.5 |
| 2,853,471 | 9/1958 | Beadell | 260—29.6 |
| 3,035,004 | 5/1962 | Glavis | 260—4 |

GEORGE F. LESMES, *Primary Examiner.*
MURRAY TILLMAN, *Examiner.*
M. J. TULLY, *Assistant Examiner.*